(12) United States Patent
Wang

(10) Patent No.: US 11,354,384 B2
(45) Date of Patent: Jun. 7, 2022

(54) INTELLIGENT OUTLIER DATA DETECTION

(71) Applicant: SAP SE, Walldorf (DE)

(72) Inventor: Kefeng Wang, Wiesloch (DE)

(73) Assignee: SAP SE, Walldorf (DE)

( * ) Notice: Subject to any disclaimer, the term of this patent is extended or adjusted under 35 U.S.C. 154(b) by 312 days.

(21) Appl. No.: 16/711,178

(22) Filed: Dec. 11, 2019

(65) Prior Publication Data

US 2021/0182361 A1   Jun. 17, 2021

(51) Int. Cl.
  *G06F 17/18*  (2006.01)
  *G06F 11/32*  (2006.01)
  *G06F 16/903*  (2019.01)

(52) U.S. Cl.
  CPC ............ *G06F 17/18* (2013.01); *G06F 11/327* (2013.01); *G06F 16/903* (2019.01)

(58) Field of Classification Search
  CPC ...... G06F 17/18; G06F 11/327; G06F 16/903; G06F 16/953
  See application file for complete search history.

(56) References Cited

U.S. PATENT DOCUMENTS

| 2017/0236060 A1* | 8/2017 | Ignatyev | ............... G06N 20/00 706/46 |
| 2018/0042174 A1* | 2/2018 | Li | ........................ A01D 41/127 |

* cited by examiner

*Primary Examiner* — Manuel L Barbee
(74) *Attorney, Agent, or Firm* — Erise IP, P.A.

(57) ABSTRACT

Transaction data is received from a remote client computing device that includes user-generated entries in each of a plurality of fields. Thereafter, it can be determined, using an outlier detection algorithm, that values for one or more of the entries is an outlier. Data can then be provided (e.g., displayed in a visual display, loaded into memory, stored in physical persistence, transmitted to a remote computing system, etc.). The outlier algorithm can be based on a number of similar records g, a number of distinct values d(g) in the similar records, and a number of same values s in the similar records. Related apparatus, systems, techniques and articles are also described.

20 Claims, 4 Drawing Sheets

Historical Data

210

New Data

| A: 01 (Male) |
| B: 03 (40-50) |
| C: CN (China) |
| D: 02 (Student) |

220

| | Existing attribute value(s) | Number of entries with historical outlier value(s) | Outlier Probability $OP(Xv) = \dfrac{g}{d(g)} \cdot \dfrac{1}{s+1}$ |
|---|---|---|---|
| A: 01 | (B:03, C:CN, D:02) | 0 | 0 | 0 * 1/(0+1) = 0 |
| B: 03 | (A:01, C:CN, D:02) | 3 (M2, M3, M10) | 2 (01,02) | 3/2 * 1/(0+1) = 1.5 |
| C: CN | (A:01, B:03, D:02) | 1 (M4) | 1 (CA) | 1/1 * 1/(0+1) = 1 |
| D: 02 | (A:01, B:03, C:CN) | 2 (M5, M8) | 2 (03,01) | 2/2 * 1/(0+1) = 1 |

240

For entry M103, outlier value is detected on attribute B: 03

New Data

| A: 01 (Male) |
| B: 03 (40-50) |
| C: CN (China) |
| D: 03 (Professional) |

230

| | Existing attribute value(s) | Number of entries with historical outlier value(s) | Outlier Probability |
|---|---|---|---|
| A: 01 | (B:03, C:CN, D:03) | 2 (M5, M9) | 2 (01,02) | 1 (M5) | 2/2 * 1/(1+1) = 0.5 |
| B: 03 | (A:01, C:CN, D:03) | 1 (M5) | 1 (03) | 1 (M5) | 1/1 * 1/(1+1) = 0.5 |
| C: CN | (A:01, B:03, D:03) | 4 (M1, M4, M5) | 3 (US, CA, CN) | 1 (M5) | 3/3 * 1/(1+1) = 0.5 |
| D: 03 | (A:01, B:03, C:CN) | 2 (M5, M8) | 2 (01,03) | 1 (M5) | 2/2 * 1/(1+1) = 0.5 |

250

For entry M104, there is no outlier value detected

FIG. 2

INTELLIGENT OUTLIER DATA DETECTION

TECHNICAL FIELD

The subject matter described herein relates to the detection of outlier values inserted into a graphical user interface-based forms.

BACKGROUND

Computer-implemented workflow processes are becoming increasingly complex. Many of such processes necessarily require users to input information into fields of forms rendered in graphical user interfaces. These workflow processes often have defined business rules or require manual approval to verify the quality of data entered by such users. As business rules can be expensive to define and implement, they are often limited to critical fields of forms which are often only a small portion of a complete data set.

Not only is data entry subject to user errors such as typographical mistakes, for more complex systems, users may simply not understand what information is being sought for any particular field. As such, data quality and consistency is an important consideration to ensure that entries are accurate and in the correct format to avoid erroneous data and/or the system later throwing an exception.

SUMMARY

In a first aspect, transaction data is received from a remote client computing device that includes user-generated entries in each of a plurality of fields. Thereafter, it can be determined, using an outlier detection algorithm, that values for one or more of the entries is an outlier. Data can then be provided (e.g., displayed in a visual display, loaded into memory, stored in physical persistence, transmitted to a remote computing system, etc.). The outlier algorithm can be based on a number of similar records g, a number of distinct values d(g) in the similar records, and a number of same values s in the similar records.

A form can be rendered in a graphical user interface of the remote computing device such that an alert can be displayed in the graphical user interface that identifies one of the outlier entries.

If an outlier entry is detected, a computer-implemented workflow can be modified to send at least one of the entries to a second computing device associated with a different user. For example, a prompt can be rendered on a graphical user interface on the second computing device that solicits approval or rejection of at least one of the entries in the received transaction data.

An outlier possibility of an entry X:OP(Xv) can be calculated as:

$$OP(Xv) = \frac{g}{d(g)} \cdot \frac{1}{s+1}$$

Various actions can be taken in connection with the outlier possibility calculation. For example, no action can be taken in connection with a OP(Xv) value of less than 1; a visual alert can be provided in a graphical user interface in connection with a OP(Xv) value of 1; and/or an exception computer-generated workflow can be initiated in connection with a OP(Xv) value in excess of 1.

A database can later be queried based on fields to obtain the similar historical records.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced outlier detection that reduces dependency on human expertise and which can improve data quality without the need for pre-defined business rules. Furthermore, the subject matter described herein allows for adaptive outlier detection that learns from pre-existing data that, in turn, decreases costs for data handling and allows for automated data governance.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a diagram illustrating determine of outliers using sample transaction data;

DETAILED DESCRIPTION

Figure 1:
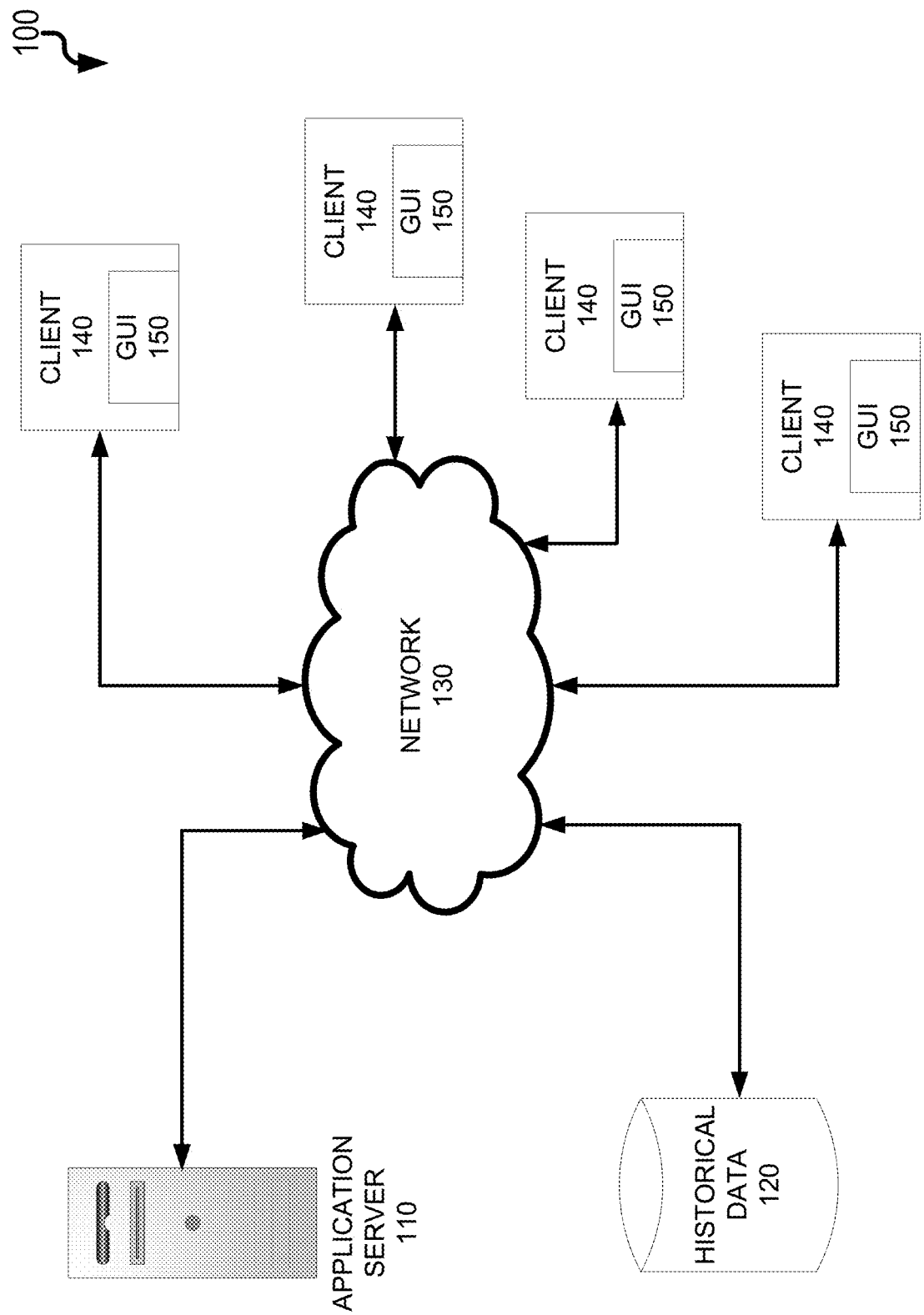
FIG. 1 is a system diagram illustrating an architecture for implementing aspects of the current subject matter.

The current subject matter is directed to enhanced techniques for identifying anomalous or outlier entries within graphical user interfaces. With reference to FIG. 1, a plurality of clients 140 (i.e., client computing devices including desktops, laptops, mobile phones, tablets, IoT devices, etc.) can each render a graphical user interface (GUI) 150. The GUI 150 can, for example, render a dedicated local application and/or a cloud-based application (i.e., in a browser) which includes at least one form by which a user inputs entries. The entries, once inputted into the GUI 150, can then be transmitted over a network 130 to an application server 110 which, for example, can execute the outlier detection techniques provided herein. These techniques can, for example, be informed using historical data (e.g., data generated by large populations of users when entering data in the same or similar form, etc.) obtained from a database 120.

The database 120 can be remote from the application server 110 while, in other variations, the database 120 can be directly coupled to or accessible by the application server 110 (not shown).

Using the techniques provided herein, alerts can be provided to a user in the GUI 150 when an entry input into a form is deemed to be an outlier. In some variations, such alerts can be provided in real-time in the GUI 150 while such entry is entered, after such entry is entered before such form is submitted, and/or when a form is submitted. In addition or in the alternative, instead of an alert being presented to a user in the form in the GUI 150, the detection of an outlier entry can cause a computer-implemented workflow to modify. For example, in some cases, the workflow can be modified such that the entries are presented to a second user in a different GUI 150 for approval or editing and the like. As a particular example, rather than having a fixed price threshold, the outlier detection techniques can be used to identify when a particular reimbursement amount on an expense form is abnormal and requires approval from a supervisor (via a computer-implemented workflow).

Referring again to FIG. 1, when a user enters data into the GUI 150 on a client 140, such data is checked by the application server 110. Such checking can include checking a frequency of such data appearing in the database 120. If a particular entry is deemed to be an outlier (as will be described in further detail below), a warning can be rendered in the corresponding GUI 150 which, in turn, can be used to encourage the user to modify his or her entry.

The application server 110 receives transaction data via the network 130. As an example, the transaction data contains several fields that were manually entered into a form rendered in a GUI 150 on a client device 140. For example, the form can include four fields A, B, C, D respectively filled with values 01, 03, CN, 02. For each field X, firstly use all other fields together to filter same data in the system, and get number of records g. In this data g, get number of distinct value of field X, name it d(g). In this data g, get number of same value as Xv, name it s. Outlier Possibility of attribute X:OP(Xv)

$$OP(Xv) = \frac{g}{d(g)} \cdot \frac{1}{s+1}$$

TABLE 1

| Algorithm output OP($X_v$) | Message Severity |
| --- | --- |
| <1 | None |
| =1 | Warning |
| >1 | Send for exception approval |

FIG. 2 is a diagram 200 illustrating historical data 210 as well as new transaction data 220, 230 including several entries for various fields (A, B, C, D). As shown in table 240, an outlier value is detected on attribute B:3 (a value of 3 for field B) due to the fact that there are three similar records having two distinct values and no records having a same value. Table 250 illustrates an arrangement in which there are no outliers.

Figure 3:
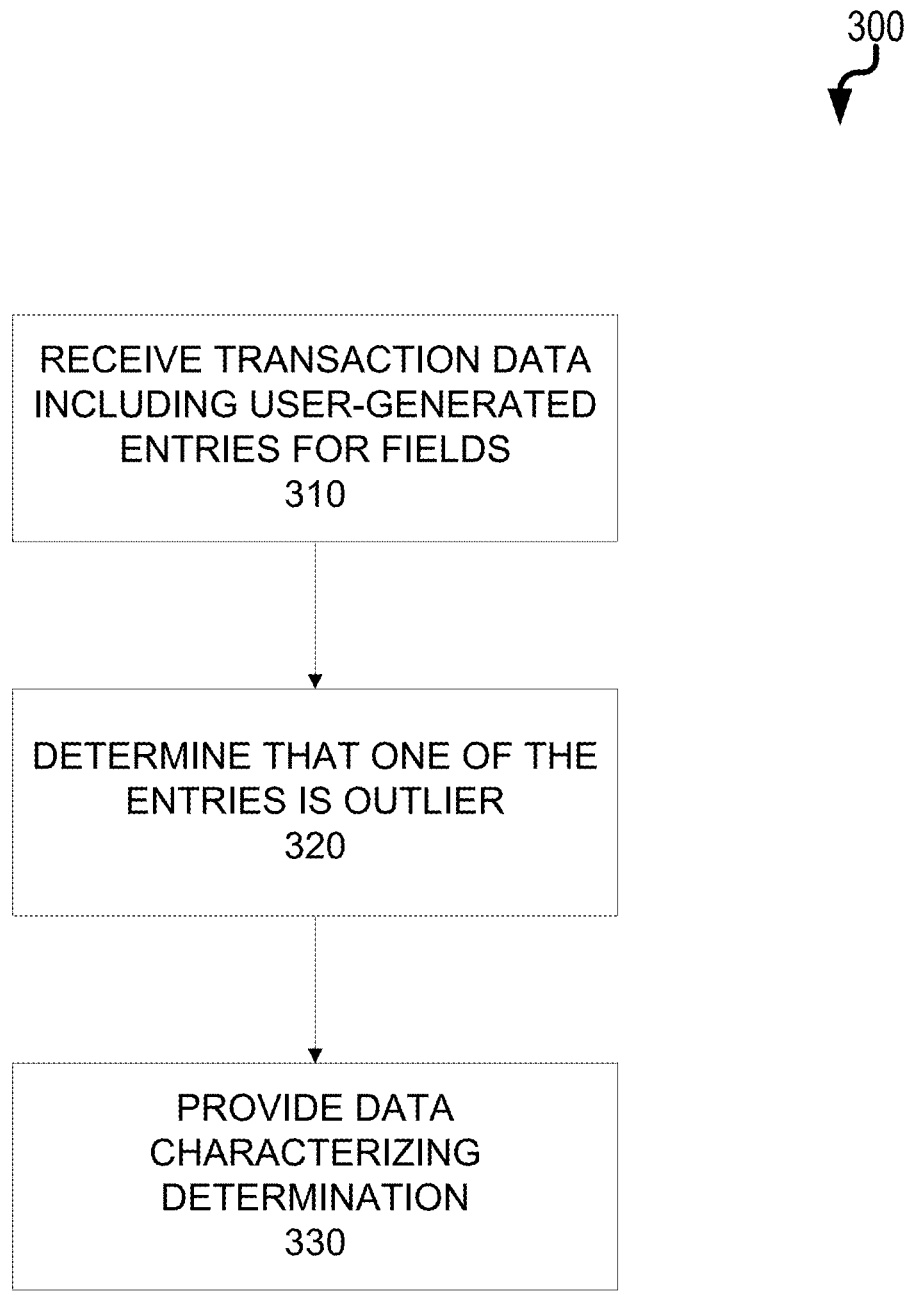
FIG. 3 is a process flow diagram illustrating intelligent outlier detection.

FIG. 3 is a diagram 300 in which, at 310, transaction data is received from a remote client computing device that includes user-generated entries in each of a plurality of fields. Thereafter, at 320, an outlier detection algorithm is used to determine that values for one or more of the entries is an outlier. The outlier algorithm can be based on a number of similar historical records g, a number of distinct values d(g) in the similar historical records, and a number of same values s in the similar historical records. Data is later provided, at 330, that characterizes the determination.

Figure 4:
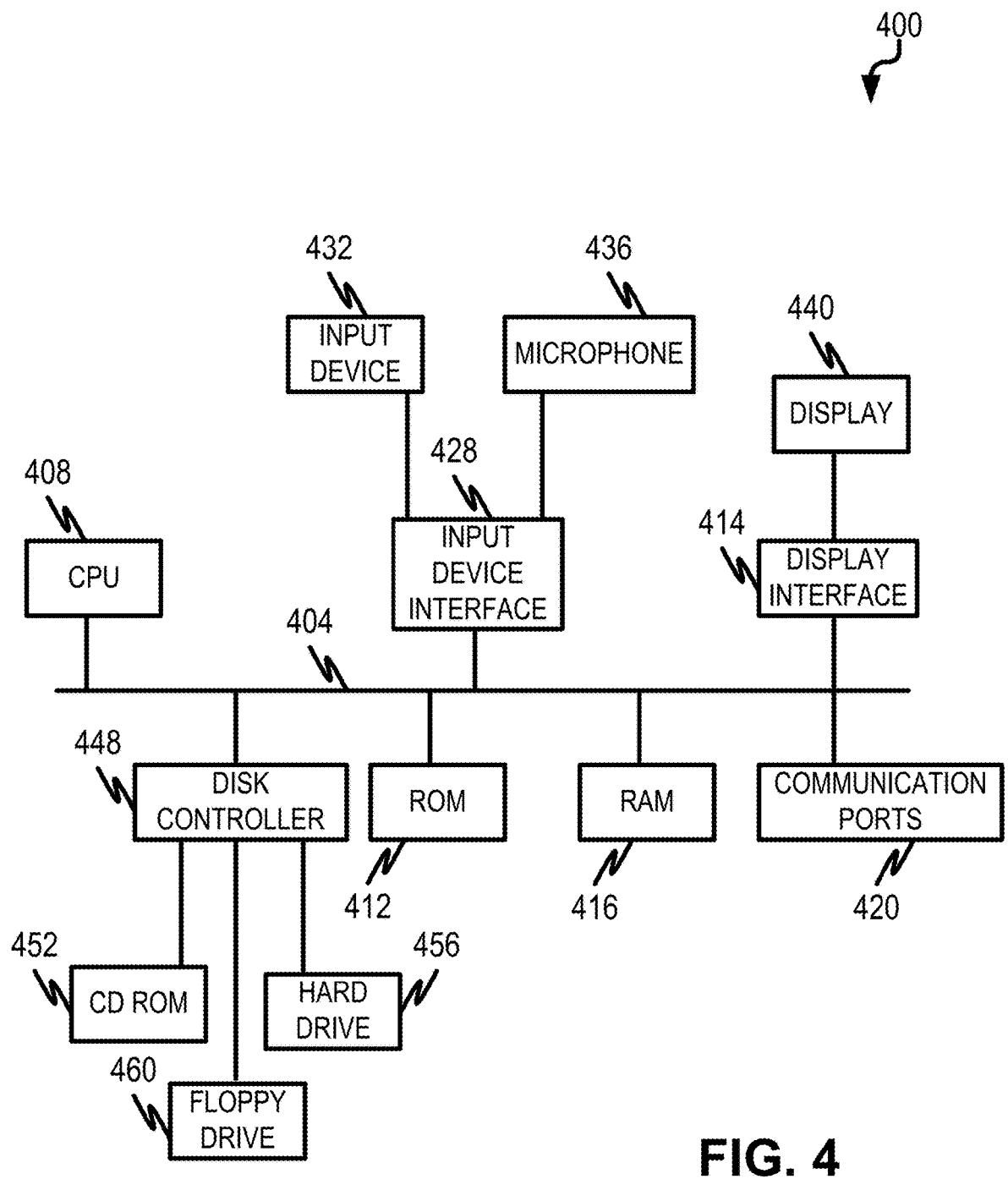
FIG. 4 is a diagram of a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving transaction data from a remote client computing device, the transaction data comprising user-generated entries in each of a plurality of fields;
   determining, using an outlier detection algorithm, that values for one or more of the entries is an outlier; and
   providing data characterizing the determination,
   wherein the outlier detection algorithm is based on a number of similar historical records g, a number of distinct values d(g) in the similar historical records, and a number of same values s in the similar historical records, and
   wherein an outlier possibility of an entry X:OP(Xv) is calculated as:

$$OP(Xv) = \frac{g}{d(g)} \cdot \frac{1}{s+1}.$$

2. The method of claim 1, wherein providing the data comprises at least one of: displaying the data in a visual display, transmitting the data to a remote computing system, loading the data into memory, or storing the data in physical persistence.

3. The method of claim 1 further comprising:
   rendering a form in a graphical user interface of the remote client computing device,
   wherein providing the data comprises displaying an alert in the graphical user interface.

4. The method of claim 1, wherein providing the data comprises:
   modifying a computer-implemented workflow to send at least one of the entries to a second computing device associated with a different user.

5. The method of claim 4 further comprising:
   rendering, in a graphical user interface on the second computing device, a prompt soliciting approval or rejection of at least one of the entries in the received transaction data.

6. The method of claim 1, wherein no action is taken in connection with an OP(Xv) value of less than 1.

7. The method of claim 6, wherein a visual alert is provided in a graphical user interface in connection with an OP(Xv) value of 1.

8. The method of claim 7, wherein an exception computer-generated workflow is initiated in connection with an OP(Xv) value in excess of 1.

9. The method of claim 1 further comprising:
   querying a database based on the fields to obtain the similar historical records.

10. A system comprising:
    at least one data processor; and
    memory storing instructions which, when executed by the at least one data processor, result in operations comprising:

receiving transaction data from a remote client computing device, the transaction data comprising user-generated entries in each of a plurality of fields;

determining, using an outlier detection algorithm, that values for one or more of the entries is an outlier; and providing data characterizing the determination, wherein the outlier detection algorithm is based on a number of similar historical records g, a number of distinct values d(g) in the similar historical records, and a number of same values s in the similar historical records, and wherein an outlier possibility of an entry X:OP(Xv) is calculated as:

$$OP(Xv) = \frac{g}{d(g)} \cdot \frac{1}{s+1}.$$

11. The system of claim 10, wherein providing the data comprises at least one of: displaying the data in a visual display, transmitting the data to a remote computing system, loading the data into memory, or storing the data in physical persistence.

12. The system of claim 10, wherein the operations further comprise:

rendering a form in a graphical user interface of the remote client computing device, wherein providing the data comprises displaying an alert in the graphical user interface.

13. The system of claim 10, wherein providing the data comprises:

modifying a computer-implemented workflow to send at least one of the entries to a second computing device associated with a different user.

14. The system of claim 13, wherein the operations further comprise:

rendering, in a graphical user interface on the second computing device, a prompt soliciting approval or rejection of at least one of the entries in the received transaction data.

15. The system of claim 10, wherein no action is taken in connection with an OP(Xv) value of less than 1.

16. The system of claim 15, wherein a visual alert is provided in a graphical user interface in connection with an OP(Xv) value of 1.

17. The system of claim 16, wherein an exception computer-generated workflow is initiated in connection with an OP(Xv) value in excess of 1.

18. A non-transitory computer readable medium storing instructions which, when executed by at least one processor, result in operations comprising:

receiving transaction data from a remote client computing device, the transaction data comprising user-generated entries in each of a plurality of fields;

determining, using an outlier detection algorithm, that values for one or more of the entries is an outlier;

providing data characterizing the determination; and querying a database based on the fields to obtain similar historical records, wherein the outlier detection algorithm is based on a number of the similar historical records g, a number of distinct values d(g) in the similar historical records, and a number of same values s in the similar historical records, and wherein an outlier possibility of an entry X:OP(Xv) is calculated as:

$$OP(Xv) = \frac{g}{d(g)} \cdot \frac{1}{s+1}.$$

19. The non-transitory computer readable medium of claim 18, wherein providing the data comprises at least one of: displaying the data in a visual display, transmitting the data to a remote computing system, loading the data into memory, or storing the data in physical persistence.

20. The non-transitory computer readable medium of claim 18, wherein the operations further comprise:

rendering a form in a graphical user interface of the remote client computing device, wherein providing the data comprises displaying an alert in the graphical user interface.

* * * * *